US009870791B1

(12) United States Patent
Sapozhnikov et al.

(10) Patent No.: US 9,870,791 B1
(45) Date of Patent: Jan. 16, 2018

(54) STABILIZATION OF ONE OR MORE UPPER SENSORS IN MULTI-SENSOR READERS (71) Applicant: Seagate Technology LLC, Cupertino, CA (US)

(72) Inventors: Victor Sapozhnikov, Minnetonka, MN (US); Steven P. Bozeman, Savage, MN (US); Mohammed Shariat Ullah Patwari, Eden Prairie, MN (US); LiWen Tan, Eden Prairie, MN (US); Jae Young Yi, Prior Lake, MN (US); Eric W. Singleton, Maple Plain, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/489,180

(22) Filed: Apr. 17, 2017

Related U.S. Application Data (60) Provisional application No. 62/322,929, filed on Apr. 15, 2016.

(51) Int. Cl.
*G11B 5/39* (2006.01)
*G11B 5/11* (2006.01)
*G11B 5/127* (2006.01)

(52) U.S. Cl.
CPC ............ *G11B 5/3958* (2013.01); *G11B 5/112* (2013.01); *G11B 5/1272* (2013.01); *G11B 5/3912* (2013.01)

(58) Field of Classification Search
None
See application file for complete search history.

(56) References Cited

U.S. PATENT DOCUMENTS

| | | | |
|---|---|---|---|
| 7,375,405 B2 | 5/2008 | Fukuzawa et al. | |
| 8,238,063 B2 | 8/2012 | Qiu et al. | |
| 8,638,530 B1 * | 1/2014 | Hsu ...................... | G11B 5/3912 360/319 |
| 8,873,204 B1 | 10/2014 | Gao et al. | |
| 8,891,207 B1 * | 11/2014 | Li .......................... | G11B 5/115 360/121 |
| 9,042,058 B1 * | 5/2015 | Li ......................... | G11B 5/3912 360/316 |
| 9,042,059 B1 * | 5/2015 | Katine ................. | G11B 5/3909 360/316 |
| 9,053,721 B1 | 6/2015 | Ahn et al. | |
| 9,099,125 B1 * | 8/2015 | Hattori ................. | G11B 5/3912 |
| 9,165,570 B2 * | 10/2015 | Lu ........................ | G01R 33/093 |
| 9,190,082 B2 * | 11/2015 | Sapozhnikov ....... | G11B 5/3951 |

(Continued)

*Primary Examiner* — Will J Klimowicz
(74) *Attorney, Agent, or Firm* — Westerman, Champlin & Koehler, P.A.

(57) ABSTRACT

A multi-sensor reader that includes a first sensor that has a first sensor stack, which includes a sensing layer that has a magnetization that changes according to an external magnetic field. The first sensor also includes a first seed layer below the first sensor stack. The multi-sensor reader also includes a second sensor stacked over the first sensor. The second sensor includes a second sensor stack, which includes a sensing layer that has a magnetization that changes according to the external magnetic field. The second sensor also includes a second seed layer below the second sensor stack. A stabilization element is included to maintain a magnetization direction of the second seed layer and to stabilize the second seed layer.

21 Claims, 10 Drawing Sheets (56) References Cited

U.S. PATENT DOCUMENTS

| | | | |
|---|---|---|---|
| 9,230,575 B2* | 1/2016 | Singleton | G11B 5/3912 |
| 9,269,383 B1 | 2/2016 | Hattori et al. | |
| 9,401,162 B1* | 7/2016 | Gao | G11B 5/3912 |
| 9,536,549 B1* | 1/2017 | Ge | G11B 5/3912 |
| 9,552,834 B1* | 1/2017 | Sapozhnikov | G11B 5/3951 |
| 9,679,591 B1* | 6/2017 | Hao | G11B 5/3912 |
| 2002/0048690 A1 | 4/2002 | Fukuzawa et al. | |
| 2004/0121185 A1 | 6/2004 | Fukuzawa et al. | |
| 2010/0067148 A1* | 3/2010 | Tsuchiya | B82Y 25/00 360/245.3 |
| 2013/0293225 A1* | 11/2013 | Singleton | B82Y 25/00 324/252 |
| 2014/0268417 A1* | 9/2014 | Singleton | G11B 5/115 360/123.12 |
| 2015/0062735 A1 | 3/2015 | Sapozhnikov et al. | |
| 2015/0140685 A1* | 5/2015 | Watanabe | H01L 21/312 438/3 |
| 2015/0243307 A1* | 8/2015 | Lu | G11B 5/3912 360/319 |
| 2015/0332713 A1* | 11/2015 | Du | G11B 5/3912 360/319 |
| 2016/0005424 A1* | 1/2016 | McKinlay | G11B 5/115 360/121 |
| 2017/0011759 A1* | 1/2017 | Ge | G11B 5/3932 |
| 2017/0154641 A1* | 6/2017 | Hao | G11B 5/397 |

* cited by examiner

STABILIZATION OF ONE OR MORE UPPER SENSORS IN MULTI-SENSOR READERS

CROSS-REFERENCE TO RELATED APPLICATIONS

This application is a non-provisional application of U.S. Provisional Application No. 62/322,929, filed on Apr. 15, 2016, the content of which is hereby incorporated in its entirety.

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor may be employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

With ever-increasing levels of recording density in disc drives and a need for faster data transfer speeds, the read transducer needs to have correspondingly better data-reproducing capabilities.

SUMMARY

The present disclosure relates to a multi-sensor reader that addresses challenges posed by greater data density requirements and faster data transfer speeds. The multi-sensor reader also addresses magnetic instability-related challenges by including at least one stabilization element for a seed layer in an upper sensor of the multi-sensor reader. The multi-sensor reader includes a first sensor that has a first sensor stack, which includes a sensing layer that has a magnetization that changes according to an external magnetic field. The first sensor also includes a first seed layer below the first sensor stack. The multi-sensor reader also includes a second sensor stacked over the first sensor. The second sensor includes a second sensor stack, which includes a sensing layer that has a magnetization that changes according to the external magnetic field. The second sensor also includes a second seed layer below the second sensor stack. A stabilization element is included to maintain a magnetization direction of the second seed layer and to stabilize the second seed layer.

Other features and benefits that characterize embodiments of the disclosure will be apparent upon reading the following detailed description and review of the associated drawings.

DETAILED DESCRIPTION OF ILLUSTRATIVE EMBODIMENTS

It should be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Magnetic reproducing device embodiments described below relate to multi-sensor readers that include at least one feature that helps prevent unwanted magnetic instability in at least one upper sensor (i.e., a sensor formed over a bottom sensor) of the multi-sensor reader. However, prior to providing additional details regarding the different embodiments, a description of an illustrative operating environment is provided below.

Figure 1:
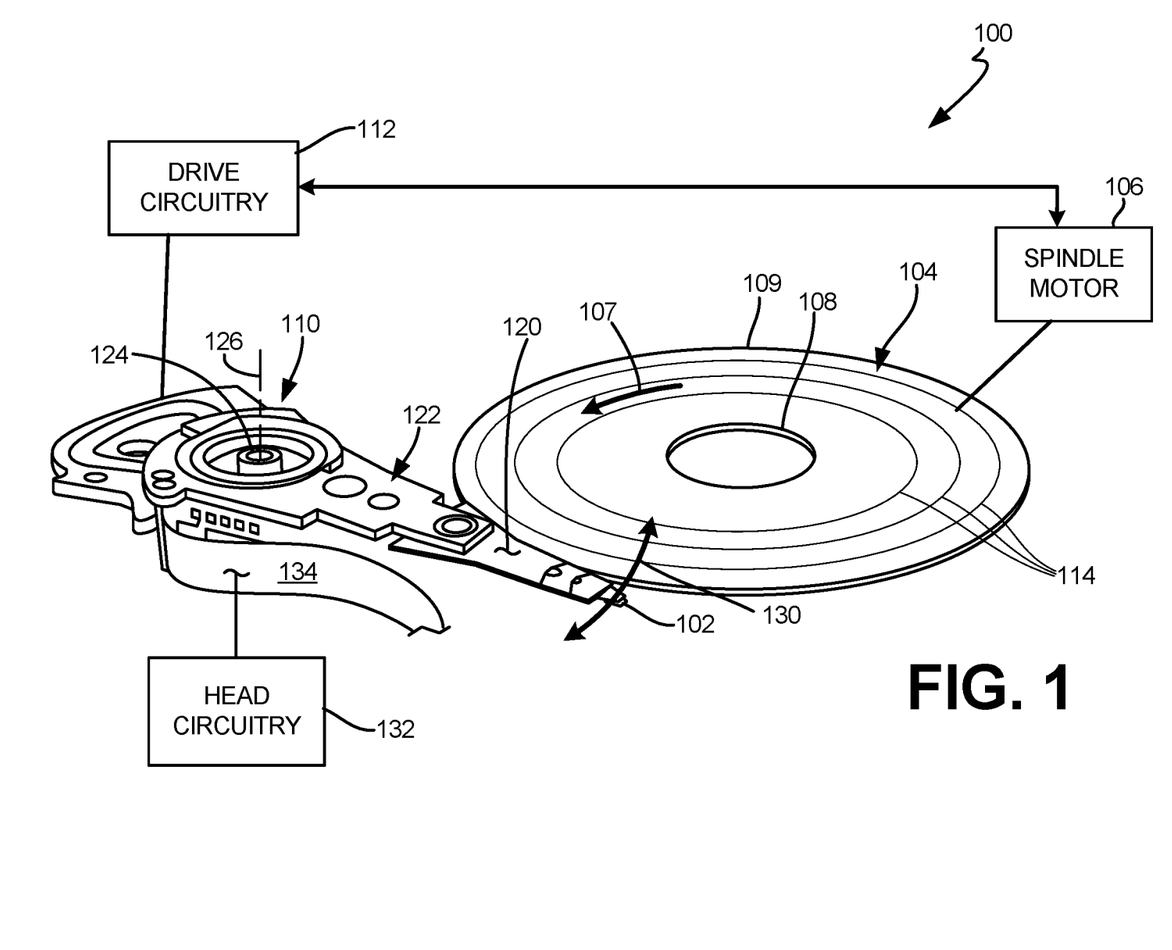
FIG. 1 is a schematic illustration of a data storage system including a data storage medium and a head for reading data from and/or writing data to the data storage medium.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
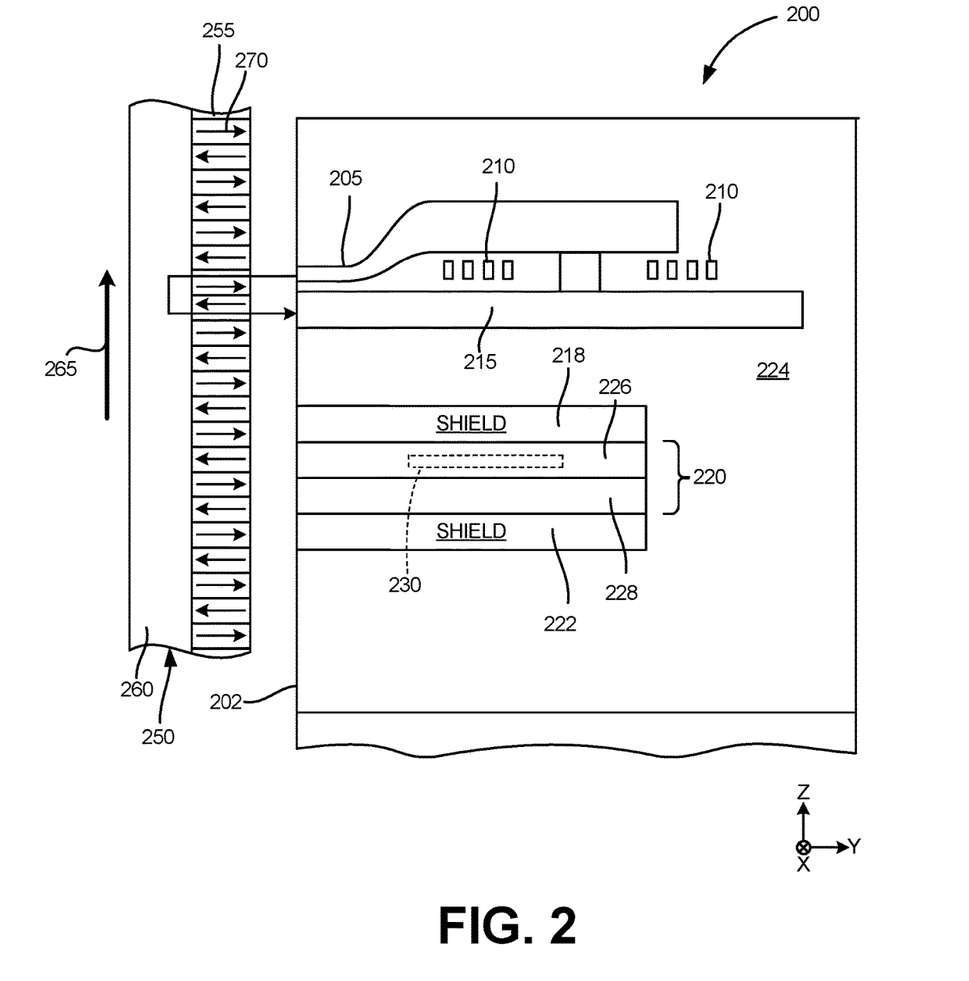
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1. Medium 250 is illustratively a data storage medium such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read transducer 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

Figure 3:
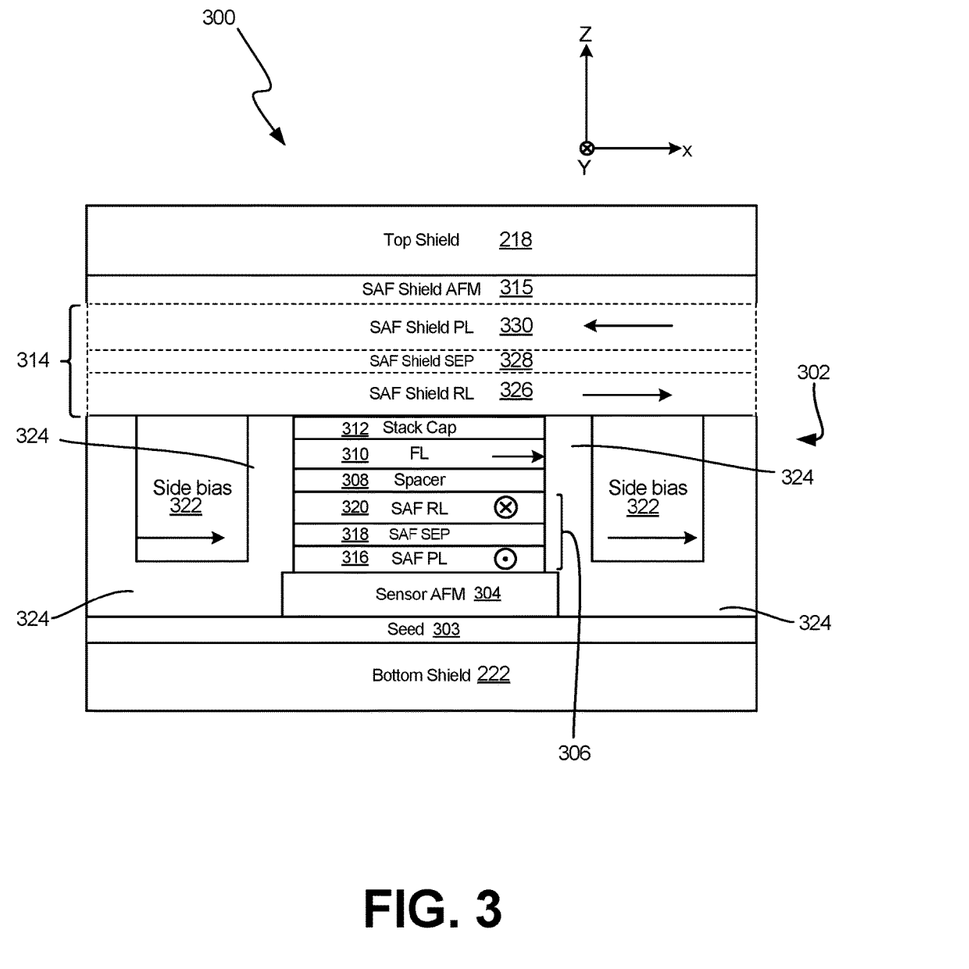
FIG. 3 is a bearing surface view of a magnetic reproducing device having a single read sensor.
Figure 4A:
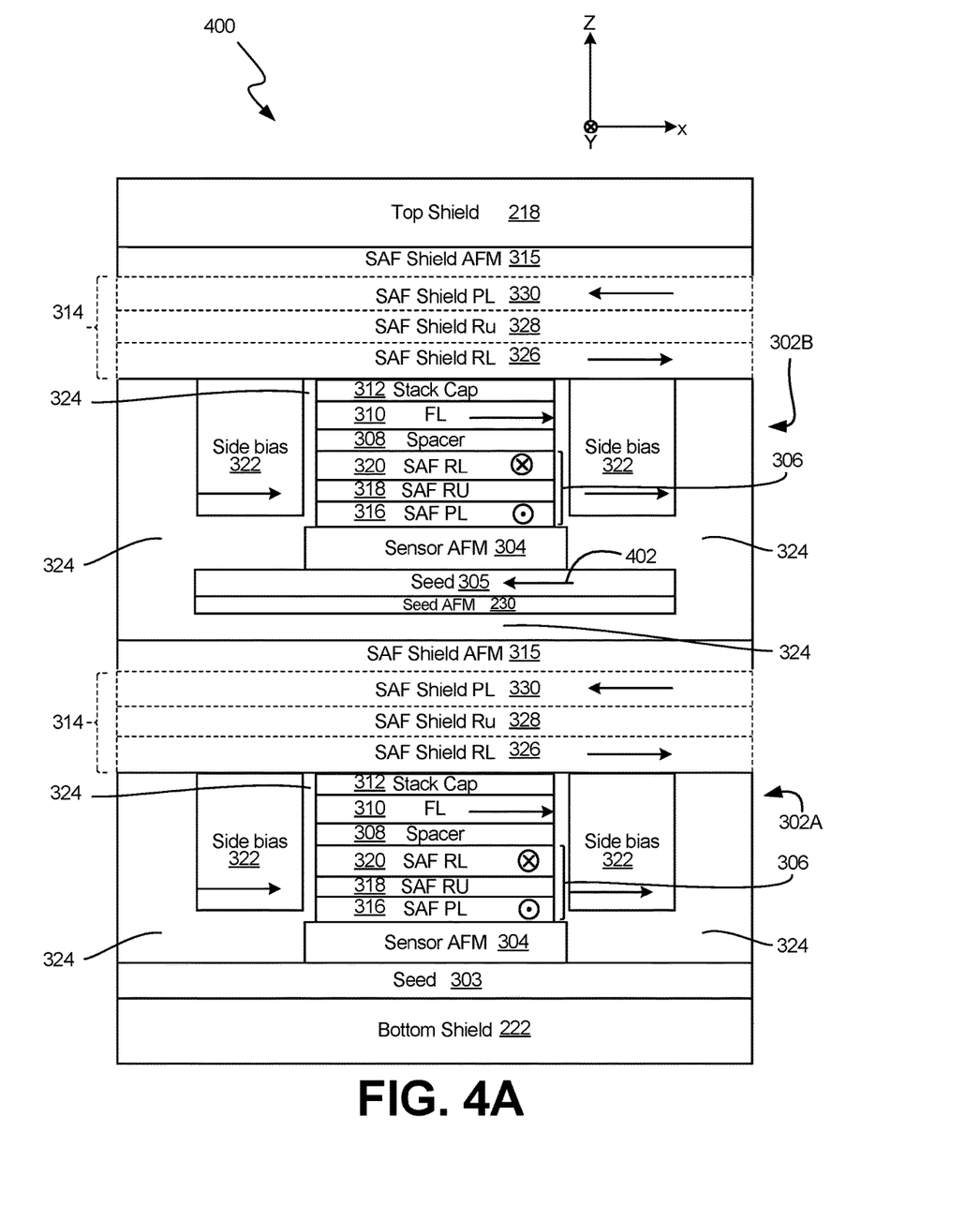
FIG. 4A is a bearing surface view of a magnetic reproducing device having multiple sensors of the type shown in FIG. 3, and a stabilization feature in an upper sensor in accordance with one embodiment.
Figure 4B:
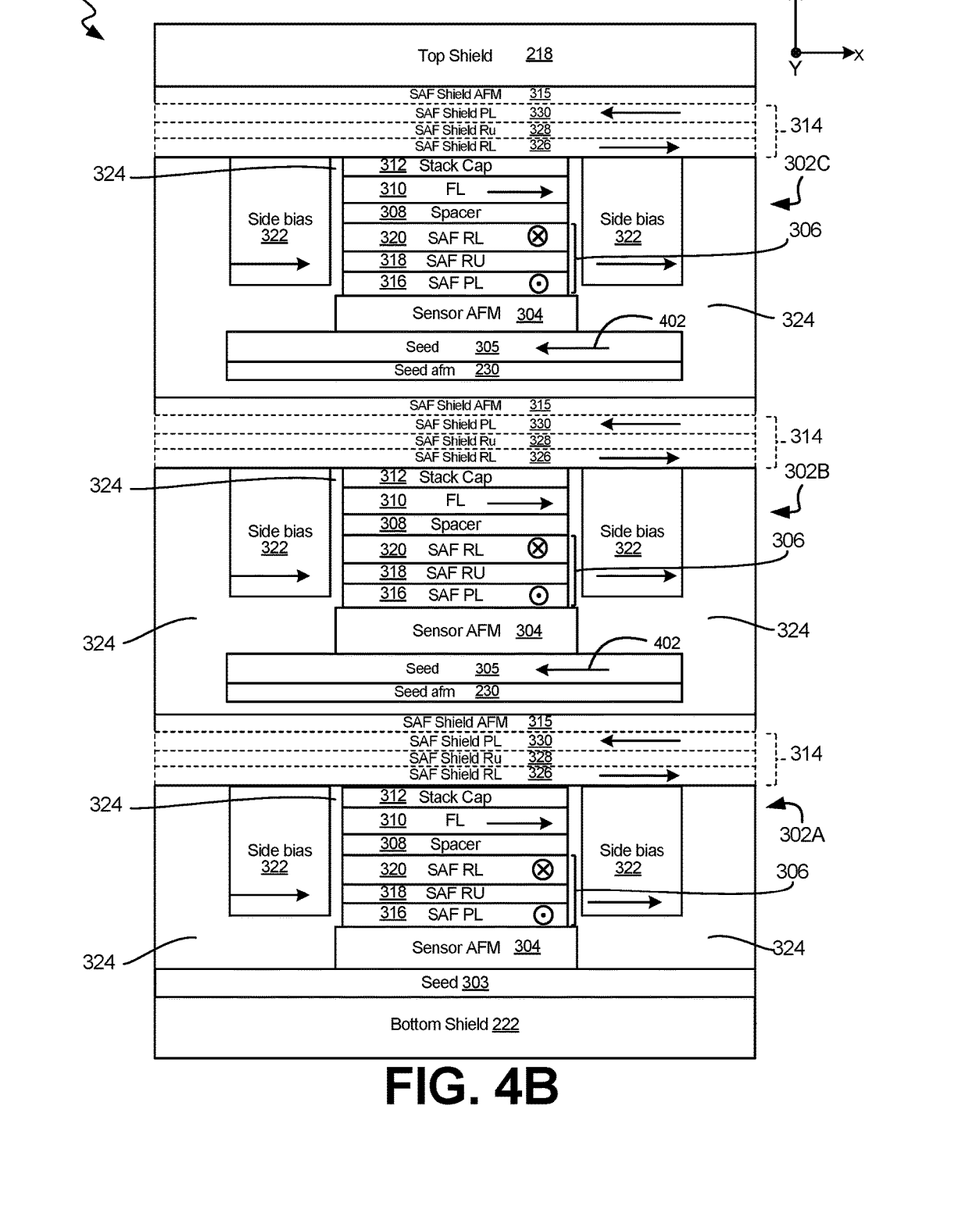
FIG. 4B is a bearing surface view of a multiple sensor reproducing device in accordance with another embodiment.

To address challenges posed by greater data density requirements and faster data transfer speeds, read transducer 220 includes multiple sensors 226 and 228. It should be noted that only two sensors 226 and 228 are shown in FIG. 2 in the interest of simplification. However, in different multi-sensor reader embodiments, any suitable number of sensors may be employed. In different multi-sensor reader embodiments, magnetic sensors may be stacked along a track direction (i.e., a z-direction in FIG. 2) or a track width direction that is perpendicular to the track direction (i.e., a cross-track direction, which is an x-direction in FIG. 2). A y-direction in FIG. 2 is then defined as a direction that is perpendicular to x and z simultaneously, which is a stripe-height direction. In the embodiment show in FIG. 2, sensors 226 and 228 are stacked along the track direction. In such embodiments, it is desirable to reduce spacing between primary sensing components of adjacent sensors 226 and 228 in order to achieve a high data storage density and because of head skew relative to the data tracks. However, as will be described further below, certain design changes to reduce spacing between primary sensing components may introduce unwanted magnetic instability. Accordingly, in the embodiment of FIG. 2, read transducer 220 includes at least one stabilization feature 230. Different layers of an embodiment of an individual sensor are shown in FIG. 3, and FIGS. 4A and 4B show multi-sensor reader embodiments including two or more sensors of the type shown in FIG. 3. Details regarding a stabilization feature such as 230 are provided further below in connection with FIGS. 4A, 4B and 5.

FIG. 3 is a schematic block diagram illustrating an example read head 300 including a single magnetoresistive sensor 302. The magnetoresistive sensor 302 is positioned between top shield 218 and bottom shield 222. Top and bottom shields 218 and 222, which may be made of a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the top and bottom shields 218 and 222 permit magnetic fields from the bit directly under magnetoresistive sensor 302 to affect the magnetoresistive sensor 302, and thus be read.

The magnetoresistive sensor 302 includes a plurality of layers including a sensor antiferromagnetic (AFM) layer 304, a sensor stack synthetic antiferromagnetic (SAF) structure 306, a spacer layer 308, a free layer or sensing layer 310 and a stack cap 312. Magnetoresistive sensor 302 also includes a seed element/layer 303 between the bottom shield 222 and the AFM layer 304. A SAF shielding structure 314 and an AFM layer 315 may optionally be included above the stack cap 312. Dashed lines are used to represent elements of SAF structure 314 and AFM layer 315 to indicate that these structures are optional.

In the embodiment shown in FIG. 3, the sensor SAF structure 306 includes a pinned layer 316 a thin separation layer 318, which may comprise a metal such as ruthenium (Ru) in some embodiments, and a reference layer 320. The magnetic moments of each of the pinned layer 316 and the reference layer 320 are not allowed to rotate under magnetic fields in the range of interest (for example, magnetic fields generated by the bits of data stored on the data discs). The magnetic moments of the reference layer 320 and the pinned layer 316 are generally oriented normal to the plane (i.e., the y direction) of FIG. 3 and anti-parallel to each other.

The magnetic moment of the free layer 310 is free to rotate under the influence of an applied magnetic field in a range of interest. The read head 300 further includes side biasing magnets or side shields 322, which produce a magnetic field that biases the free layer 310 with a magnetic moment parallel to the plane of the figure and generally oriented horizontally. This bias prevents the magnetic moment of the free layer 310 from drifting due to, for example, thermal energy, which may introduce noise into the data sensed by the read head 300. The bias is sufficiently small, however, that the magnetic moment of the free layer 310 can change in response to an applied magnetic field, such as a magnetic field of a data bit stored on the data discs. In some embodiments, the side biasing magnets or side shields 332 are formed of soft magnetic material (i.e., material that can be easily magnetized and demagnetized at relatively low magnetic fields). The soft magnetic material may be an alloy comprising Ni and Fe. The magnetoresistive sensor 302 is separated and electrically isolated from the side biasing magnets 322 by an isolation layer 324 including, for example, insulating materials. Isolation layer 324 may also be present in other regions of head 300 as shown in FIG. 3.

In the embodiment shown in FIG. 3, optional SAF shielding structure 314 includes a SAF shield reference layer 326, a thin SAF shield separation layer 328, which may comprise a metal such as Ru in some embodiments, and a SAF shield pinned layer 330. Because, in some embodiments, sensor 300 utilizes soft side shields 322, SAF shield reference layer 326 needs to have a relatively fixed magnetization to assist in stabilizing the magnetizations of side shields 322. Thus, in such embodiments, an AFM layer 315 needs to pin the magnetization of SAF shield pinned layer 330 substantially parallel to the bearing surface, which results in the relatively fixed magnetization of SAF shield reference layer 326 due to antiferromagnetic coupling across SAF shield separation layer 328 and thus in stabilizing the magnetizations of the side shields 322 substantially parallel to the bearing surface as well. SAF shield reference layer 326 and SAF shield pinned layer 330 may be formed of a soft magnetic material (for example, an alloy comprising Ni and Fe). It should be noted that, instead of employing SAF shielding structure 314 and AFM layer 315, side shields 322 may be stabilized by shape anisotropy, by employing hard magnetic layers adjacent to the soft magnetic layers within side shield 322, or by any other suitable technique.

In some embodiments, sensor 302 may utilize tunnel magnetoresistance (TMR) or giant magnetoresistance (GMR) effects. In embodiments that utilize TMR effects, spacer layer 308 is a tunneling barrier layer that separates the SAF structure 306 from the free layer 310. The tunneling barrier layer 308 is sufficiently thin that quantum mechanical electron tunneling occurs between a reference layer 320 in the SAF structure 306 and the free layer 310. The electron tunneling is electron-spin dependent, making the magnetic response of the magnetoresistive sensor 302 a function of the relative orientations and spin polarizations of the SAF structure 306 and the free layer 310. The highest probability of electron tunneling occurs when the magnetic moments of the SAF structure 306 and the free layer 310 are parallel, and the lowest probability of electron tunneling occurs when the magnetic moments of the SAF structure 306 and the free layer 310 are antiparallel. Accordingly, the electrical resistance of the magnetoresistive sensor 302 changes in response to an applied magnetic field. The data bits on the data discs in the disc drive may be magnetized in a direction normal to the plane of FIG. 3, either into the plane of the figure, or out of the plane of the figure. Thus, when the magnetoresistive sensor 302 passes over a data bit, the magnetic moment of the free layer 310 is rotated either into the plane of FIG. 3 or out of the plane of FIG. 3, changing the electrical resistance of the magnetoresistive sensor 302. The value of the bit being sensed by the magnetoresistive sensor 302 (for example, either 1 or 0) may therefore be determined based on the current flowing from a first electrode (not shown) to a second electrode (not shown) connected to the magnetoresistive sensor 302.

FIG. 4A is a schematic block diagram illustrating an example read head 400 including multiple magnetoresistive sensors (for example, 302A and 302B) stacked along a track direction (i.e., the z-direction in FIG. 4A). In some embodiments, sensors 302A and 302B in sensor 400 may be isolated from each other by isolation layer 324, which is present in a region between sensors 302A and 302B in FIG. 4A. Each of sensors 302A and 302B is similar to sensor 302 of FIG. 3 and therefore a description of individual sensors 302A and 302B is not provided in connection with FIG. 4A. However, it should be noted that, while bulk shield 222 is a bottom shield for sensor 302A and element 303 is a separate seed for sensor 302A, element 305 has a dual function of being both a seed and a bottom shield for sensor 302B.

An important contributor to a down-track distance between sensors of a dual-sensor reader is a thickness of the seed of the upper sensor. Therefore, the seed of the upper sensor is made relatively thin and is not coupled to a separate bottom shield like the seed in the lower sensor. Such a thin and unsupported seed may be prone to instability. Accordingly, to address a need for improved stability, a stabilization element 230 is added below the seed 305 of read head 400.

In some embodiments, the stabilization element 230 is an antiferromagnetic (AFM) layer that pins a magnetization of the seed layer 305 to a predetermined direction (for example, the direction shown by arrow 402). In some embodiments, seed layer 305 has a thickness between about 4 nanometers (nm) and about 20 nm, and AFM layer 230 has a thickness between about 4 nm and about 10 nm. In a particular embodiment, seed layer 305 is about 10 nm thick and AFM layer 230 is about 6 nm thick. In general, seed layer 305 and AFM layer 230 may be of any suitable thickness. Examples of materials used to form AFM layer 230 include IrMn, FeMn, PtMn, NiMn, PdMn, PtPdMn and RhMn. Of course, any other suitable materials may also be used.

In some embodiments, seed layer 305 may be formed of a soft magnetic material (for example, an alloy comprising Ni and Fe). In other embodiments, seed layer 305 may be formed of a soft material having a higher moment than NiFe. As indicated earlier, element 305 has a dual function of being both a seed and a bottom shield for sensor 302B. In a certain thickness range (for example, 5 nm to 50 nm), the shielding effect of a seed layer such as 305 is a function of both a thickness and a moment of the seed layer 305. Accordingly, employing relatively high-moment magnetic layers for the seed layer 305 allows for a reduction in thicknesses of the seed layer 305 without a corresponding reduction in, for example, a shielding effect of the seed layer 305 compared to the shielding effect of a similar thicker seed layer formed of NiFe. As indicated above, in some embodiments, the relatively high magnetic moment value of the seed layer 305 is greater than that of NiFe. In other embodiments, the relatively high magnetic moment value of the seed layer 305 is greater than about 1.5 Tesla. In such embodiments, examples of relatively high-moment materials that can be utilized for the seed layer 305 are CoFe and CoNiFe. Of course, other high-moment magnetic materials may also be suitable in certain applications. As noted above, the bulk seed layer 305 of a suitable thickness is pinned by the AFM layer 230.

The reader design described in connection with FIG. 4A can also be employed for a reader 450 with more than two sensors (for example, 302A, 302B and 302C) as shown in FIG. 4B. A separate description of the individual elements of reader 450 is not provided due to their similarity to the elements of reader 400 of FIG. 4A.

As noted earlier, multi-sensor readers that employ a relatively thin bulk magnetic layer as a seed for an upper sensor may suffer from unwanted magnetic instability. Further, with such thin bulk magnetic seeds, elevated Barkhausen jumps (a succession of abrupt changes in magnetization occurring when a magnetizing force acting on a piece/layer of magnetic material is varied), elevated sensitivity of Barkhausen jumps to temperature and elevated field dependent glitch (FDG) have been observed. Also, experiments have shown that a moderate increase in seed thickness (about 10 nm) does not substantially improve the stability metrics.

In the embodiments described above, the element 230 is employed to stabilize the bulk seed layer 305. This improves the magnetic seed stability/noise while only increasing inter-sensor distance by about 6 nm.

Further, the new design has shown Barkhausen jump values equivalent to those of a single-sensor reader in which a magnetic seed is coupled to a bulk shield. Additionally, in such embodiments, Barkhausen jump sensitivity to temperature has also improved and substantially matches that of the single-sensor reader design. Further, the above embodiments provide the ability to control the magnetization direction of the seed layer of the upper sensor(s). Experiments have shown that a suitable magnetization direction of the seed 305 (against the free layer bias as shown by direction 402 in the above embodiments) improves pulse width 50 (PW50) (a width of a read pulse at 50% of its peak amplitude) by about 0.7 nm.

It should be noted that, although the different figures show bottom and top sensors 302A and 302B aligned with each in the z direction, different sensors may be offset from each other in various embodiments.

Figure 5:
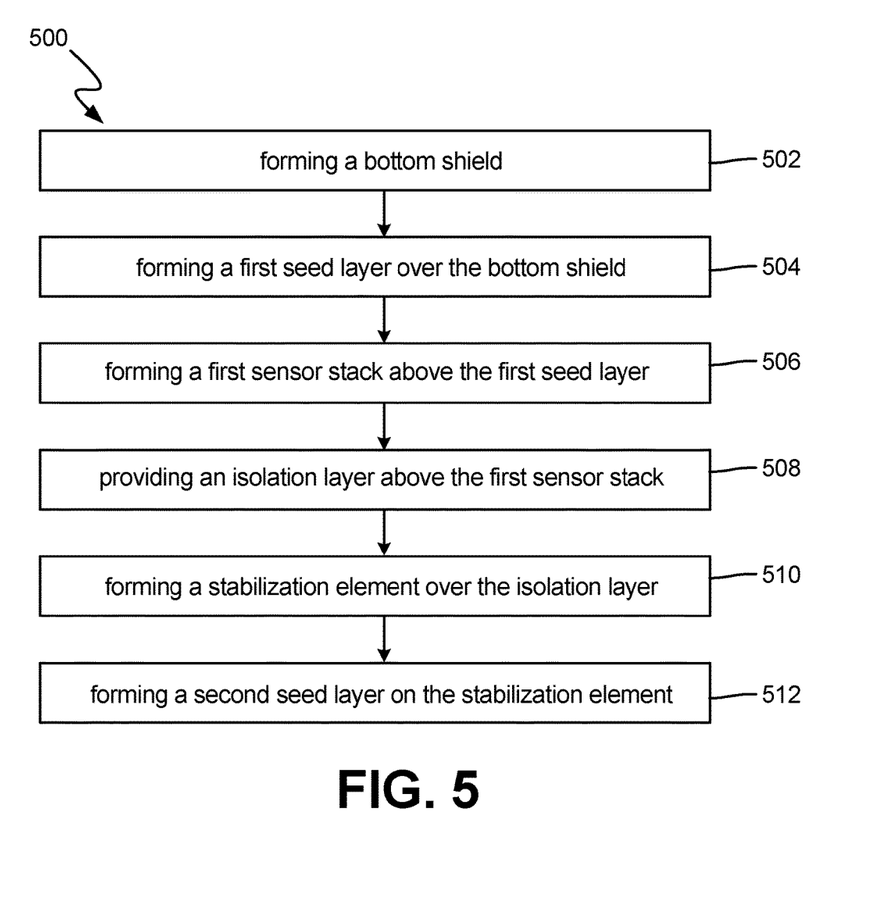
FIG. 5 is a flow diagram of a method embodiment.
Figure 6A:
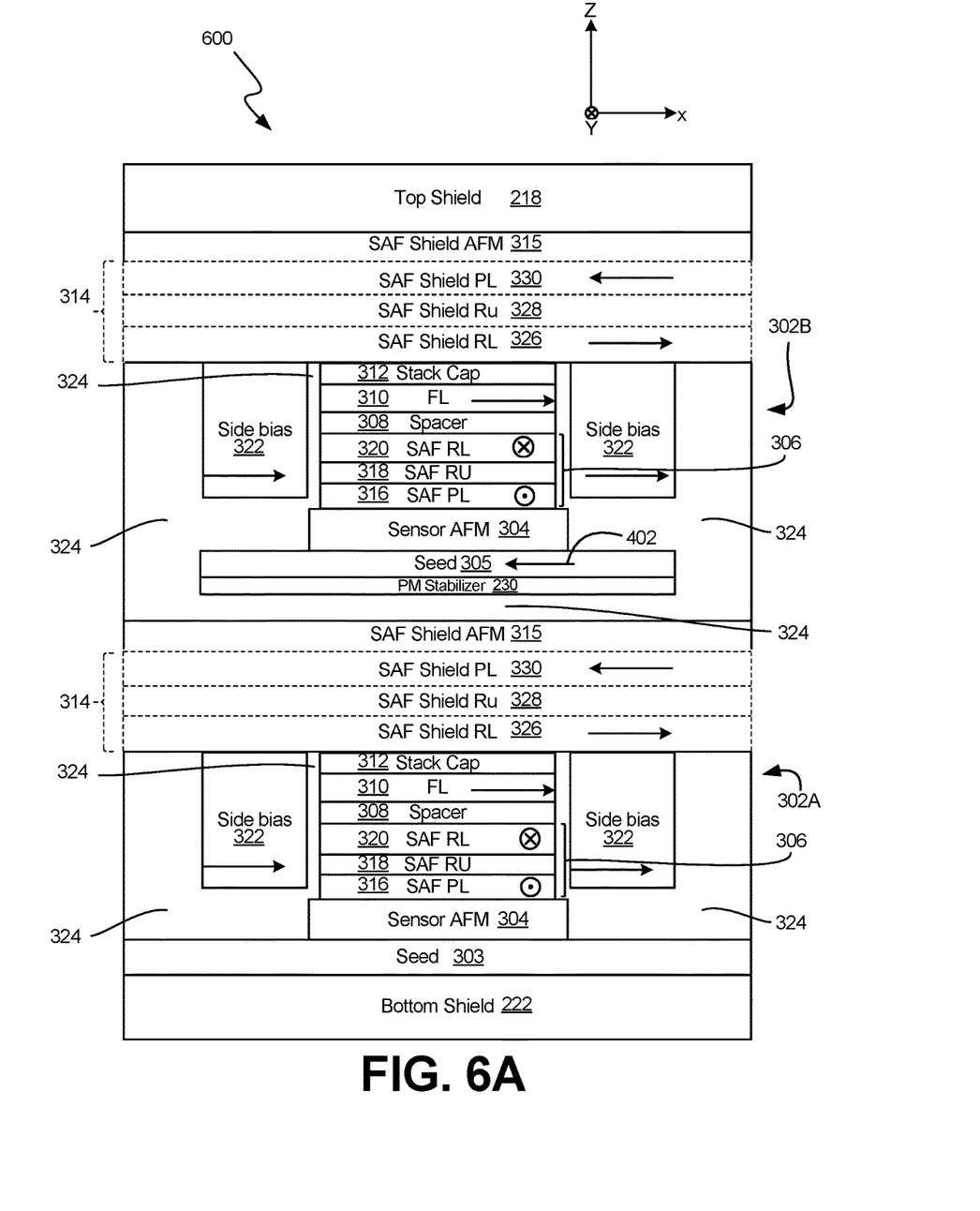
FIGS. 6A-6D are bearing surface views of magnetic reproducing devices in accordance with different embodiments.
Figure 6B:
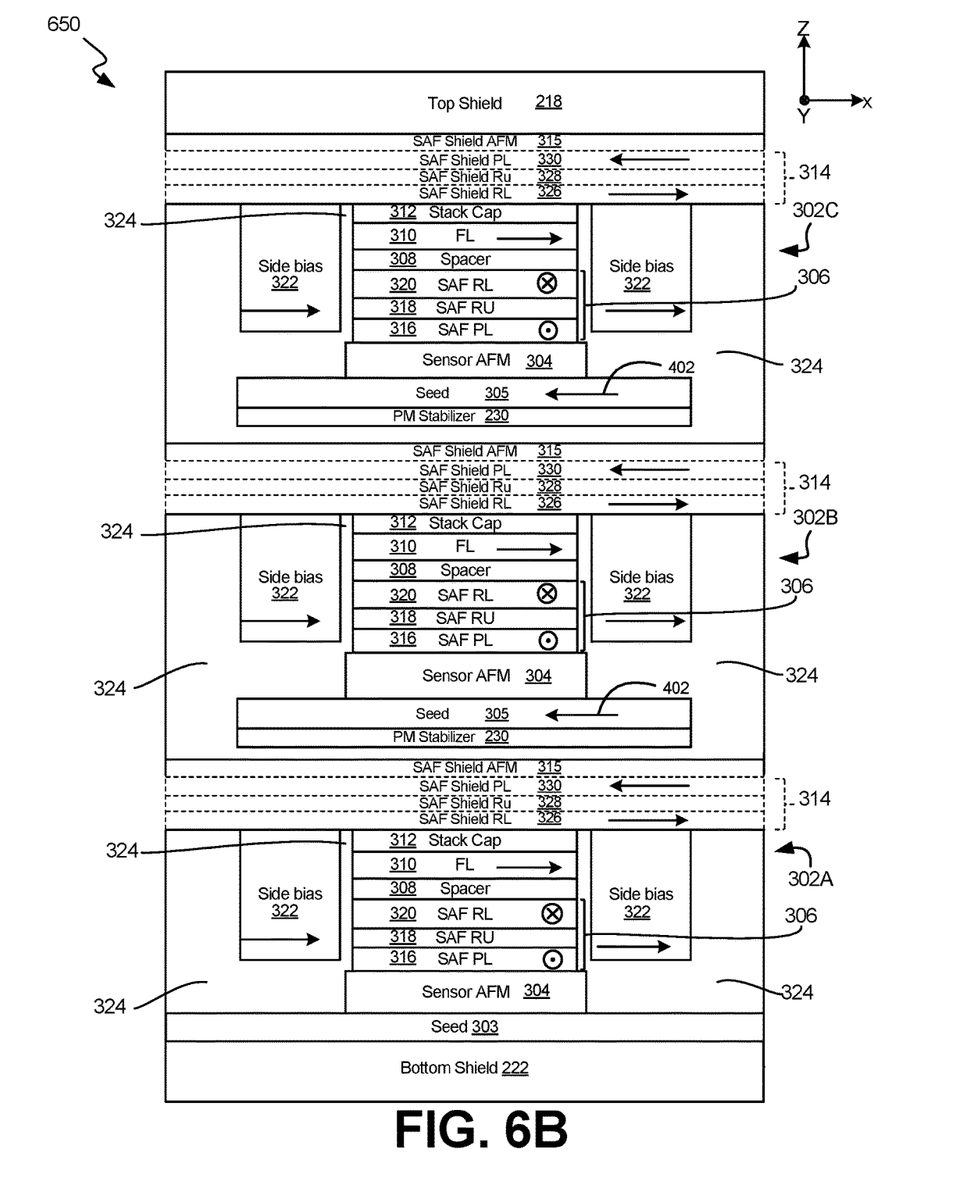
Figure 6C:
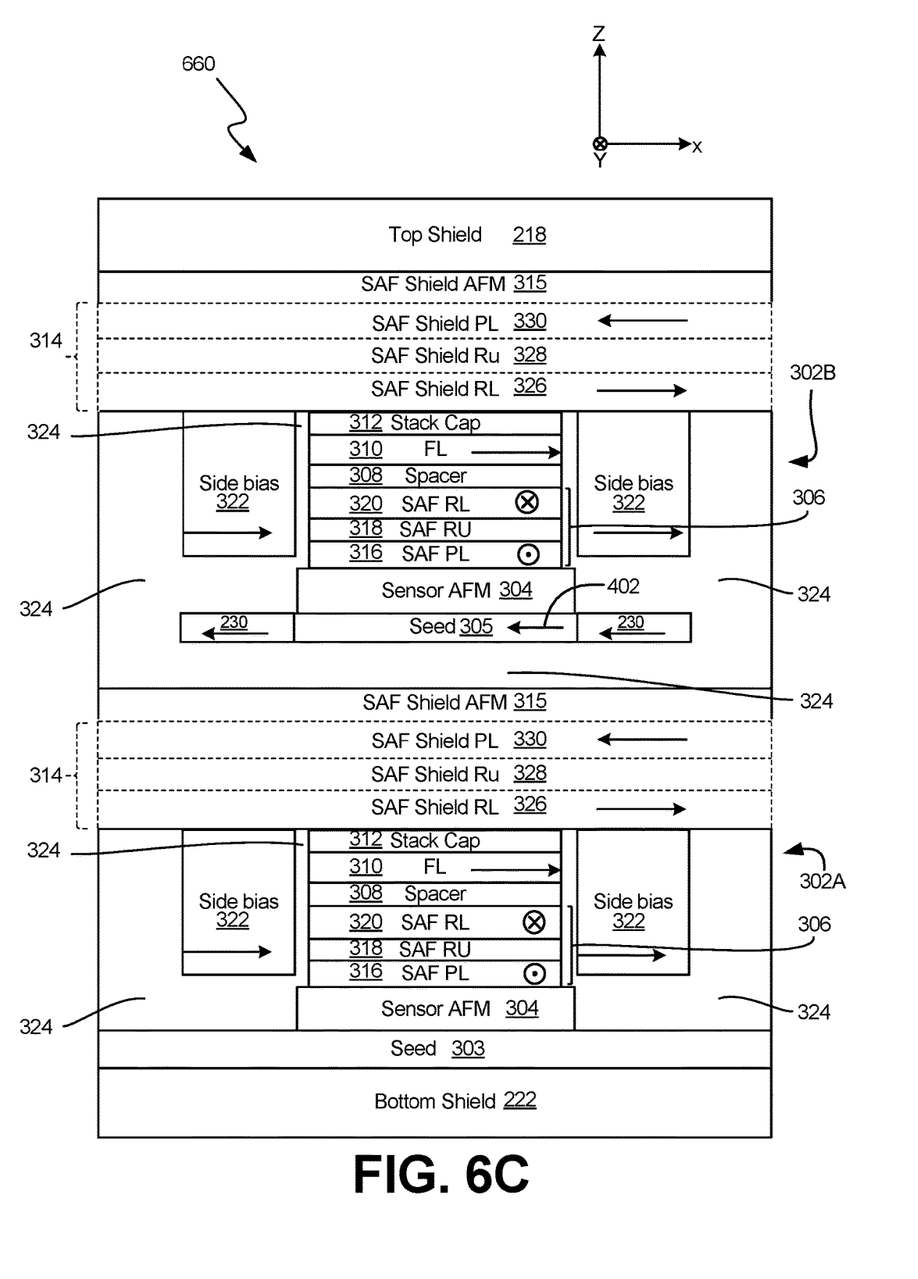
Figure 6D:
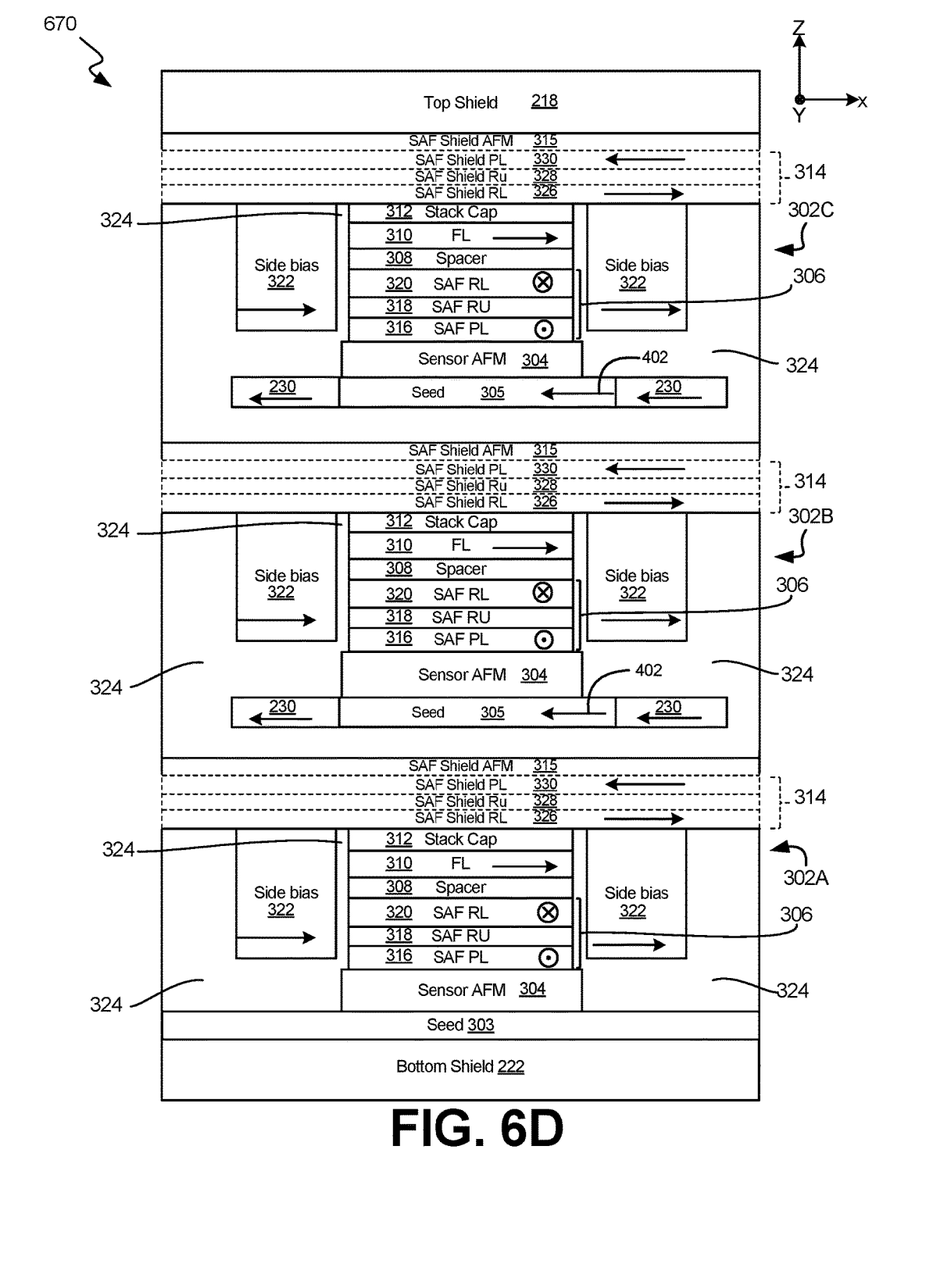

FIG. 5 shows a simplified flow diagram 500 of a method of forming a multi-sensor reader in accordance with one embodiment. At step 502, a bottom shield is formed. At step 504, a first seed layer is formed over the bottom shield. This is followed by step 506 at which a first sensor stack is formed above the first seed layer. At step 508, an isolation layer is provided above the first sensor stack. At step 510, a stabilization element is formed over the isolation layer. At step 512, a second seed layer is formed on the stabilization element.

It should be noted that any suitable deposition techniques may be used to form the different layers in steps 502-512. It should also be noted that the multi-sensor reader may include several additional layers formed between, above, and/or below the layers formed in steps 502-512. It should be noted that, in some single sensor reader embodiments of the type shown in FIG. 3, bulk shield 222 may be replaced by a stabilization element such as 230 to pin a magnetization of element 303 in a predetermined direction.

In the above-described embodiments, the stabilization element 230 is described as being an antiferromagnetic (AFM) layer that pins a magnetization of the seed layer 305 to a predetermined direction (for example, the direction shown by arrow 402). However, in other embodiments, a high coercivity permanent magnet (PM), such as FePt or CoPt, may be used instead of the AFM layer to stabilize the seed layer 305, which may be formed of any suitable soft magnetic material. Such alternate embodiments are shown in FIGS. 6A, 6B, 6C and 6D. In the embodiments shown in FIGS. 6A (reader 600) and 6B (reader 650), the PM stabilizer 230 is positioned beneath the seed layer 305 and provides stabilization to the seed layer 305 via exchange coupling to the seed layer 305. In the embodiments shown in FIGS. 6C (reader 660) and 6D (reader 670), PM stabilizers 230 abut the seed layer 305 and provide stabilization to the seed layer 305 by way of the magnetic fields of the PM stabilizers 230. Is should be noted that, although the stabilization feature 230 is shown positioned at the bearing surface in the different figures, the stabilization feature 230 may be recessed from the bearing surface in some embodiments. In general, the stabilization feature 230 may be positioned at any suitable location as long as the stabilization feature 230 is in contact with the seed layer 305. The stabilization feature 230 may be included in any or all of the sensors in a multi-sensor reader (i.e., in some embodiments, feature 230 may also be utilized to stabilize seed 303 of bottom sensor 302A). As noted earlier, SAF structure 314 is optional. Further, instead of SAF structure 314, a single magnetic layer that is pinned by AFM 315 may be employed in some embodiments.

Although various examples of stabilization features within multiple sensor magnetic reproducing devices are disclosed in the application, embodiments are not limited to the particular applications or uses disclosed in the application. It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the multiple sensor magnetic reproducing device with the stabilization feature while maintaining substantially the same functionality without departing from the scope and spirit of the present disclosure. In addition, although the embodiments described herein are directed to a particular type of multiple sensor magnetic reproducing device utilized in a particular data storage system, it will be appreciated by those skilled in the art that the teachings of the present disclosure can be applied to other data storage devices without departing from the scope and spirit of the present disclosure.

What is claimed is:

1. A multi-sensor reader comprising:
 a first sensor comprising:
  a first sensor stack comprising a sensing layer having a magnetization that changes according to an external magnetic field; and
  a first seed layer below the first sensor stack; and
 a second sensor stacked over the first sensor, the second sensor comprising:
  a second sensor stack comprising a sensing layer having a magnetization that changes according to the external magnetic field;
  a second seed layer below the second sensor stack; and
  a stabilization element that maintains a magnetization direction of the second seed layer and stabilizes the second seed layer,
  wherein the stabilization element is in direct contact with an insulation layer between the first sensor stack and the second sensor stack.

2. The multi-sensor reader of claim 1 and wherein the stabilization element comprises an antiferromagnetic layer that is in contact with a bottom surface of the second seed layer.

3. The multi-sensor reader of claim 2 and wherein the antiferromagnetic layer comprises one of IrMn, FeMn, PtMn, NiMn, PdMn, PtPdMn or RhMn.

4. The multi-sensor reader of claim 2 and wherein the antiferromagnetic layer has a thickness between 4 nm and 10 nm.

5. The multi-sensor reader of claim 2 and further comprising a bottom shield layer that is magnetically coupled to the first seed layer.

6. The multi-sensor reader of claim 1 and wherein the second seed layer has a thickness between 4 nanometers (nm) and 20 nm.

7. The multi-sensor reader of claim 5 and wherein the bottom shield layer is substantially thicker than the antiferromagnetic layer.

8. The multi-sensor reader of claim 1 and further comprising a bearing surface, and wherein the magnetization direction of the second seed layer is substantially parallel to a plane of the bearing surface.

9. The multi-sensor reader of claim 8 and wherein the magnetization direction of the second seed layer and the magnetization direction of the sensing layer of the second sensor stack are anti-parallel to each other.

10. The multi-sensor reader of claim 1 and wherein the second seed layer comprises at least one of NiFe, CoFe or CoNiFe.

11. The multi-sensor reader of claim 1 and wherein the stabilization element comprises a permanent magnet.

12. A multi-sensor reader comprising:
a first sensor comprising:
a first sensor stack comprising a sensing layer having a magnetization that changes according to an external magnetic field; and
a first seed layer below the first sensor stack; and
a plurality of sensors stacked over the first sensor, wherein at least one of the plurality of sensors comprises:
a second sensor stack comprising a sensing layer having a magnetization that changes according to the external magnetic field;
a second seed layer below the second sensor stack; and
a stabilization element in contact with the second seed layer,
wherein the stabilization element is in direct contact with an insulation layer between the first sensor stack and the second sensor stack.

13. The multi-sensor reader of claim 12 and wherein the stabilization element comprises an antiferromagnetic layer that is in contact with a bottom surface of the second seed layer, and wherein the antiferromagnetic layer maintains a magnetization direction of the second seed layer and stabilizes the second seed layer.

14. The multi-sensor reader of claim 13 and wherein the antiferromagnetic layer has a thickness of about 6 nm.

15. The multi-sensor reader of claim 13 and further comprising a bottom shield layer that is magnetically coupled to the first seed layer, and wherein the bottom shield layer is substantially thicker than the antiferromagnetic layer.

16. The multi-sensor reader of claim 12 and wherein the second seed layer has a thickness of about 10 nanometers (nm).

17. A reader comprising:
at least one sensor comprising:
a sensor stack comprising a sensing layer having a magnetization that changes according to an external magnetic field;
a sensor antiferromagnetic layer;
a seed layer below the sensor stack, the seed layer having a top surface in contact with the sensor antiferromagnetic layer; and
a stabilization element that maintains a magnetization direction of the seed layer and stabilizes the seed layer, the stabilization element being in contact with a bottom surface of the seed layer.

18. The reader of claim 17 and wherein the stabilization element comprises an antiferromagnetic layer that is in contact with the bottom surface of the seed layer.

19. The reader of claim 18 and wherein the antiferromagnetic layer comprises one of IrMn, FeMn, PtMn, NiMn, PdMn, PtPdMn or RhMn.

20. The reader of claim 18 and wherein the antiferromagnetic layer has a thickness between 4 nm and 10 nm.

21. The reader of claim 17 and wherein the seed layer has a thickness between 4 nanometers (nm) and 20 nm.

* * * * *